(12) United States Patent
Pop

(10) Patent No.: US 11,301,985 B2
(45) Date of Patent: Apr. 12, 2022

(54) SENSING AND ALERT SYSTEM FOR ELECTRICAL SWITCHGEAR

(71) Applicant: ADVANCETREX SENSOR TECHNOLOGIES CORP., Walnut, CA (US)

(72) Inventor: Florin Pop, Glenview, IL (US)

(73) Assignee: Advancetrex Sensor Technologies Corp, Walnut, CA (US)

( * ) Notice: Subject to any disclaimer, the term of this patent is extended or adjusted under 35 U.S.C. 154(b) by 396 days.

(21) Appl. No.: 15/833,087

(22) Filed: Dec. 6, 2017

(65) Prior Publication Data

US 2019/0172189 A1    Jun. 6, 2019

(51) Int. Cl.
*G06T 7/00*       (2017.01)
*G08B 21/18*      (2006.01)
(Continued)

(52) U.S. Cl.
CPC .............. *G06T 7/001* (2013.01); *G01S 17/04* (2020.01); *G01S 17/88* (2013.01);
(Continued)

(58) Field of Classification Search
CPC combination set(s) only.
See application file for complete search history.

(56) References Cited

U.S. PATENT DOCUMENTS 7,738,008 B1 *  6/2010  Ball ................... G06K 9/00771
                                                348/159
10,156,634 B2 * 12/2018  Fitzgibbon ............. G01S 17/04
(Continued)

FOREIGN PATENT DOCUMENTS

CN      205 985 762       2/2017
DE    10 2007 025373      7/2008
KR       101 794 161     11/2017

OTHER PUBLICATIONS

"A Real-Time IR-Fusion Switchgear Contact Monitoring System (SCMS)"—Yunfeng Yan, Donglian Qi, and Hong Gu; IEEE Access; Received Mar. 17, 2017, accepted Apr. 12, 2017, date of publication May 25, 2017, date of current version Jul. 17, 2017 (Year: 2017).*

(Continued)

*Primary Examiner* — Mainul Hasan
(74) *Attorney, Agent, or Firm* — HoustonHogle LLP

(57) ABSTRACT

A sensing and alert system is installed in a plurality of electrical switchgear cabinets. Each switchgear cabinet includes at least one high-voltage circuit breaker, and each switchgear cabinet is in communication with a central programmable logic controller (PLC) configured to activate and deactivate the high-voltage circuit breaker in the corresponding switchgear cabinet. The sensing and alert system includes a time of flight (ToF) sensor arranged to capture real-time image data, a lighting module affixed to an inside portion of the switchgear cabinet, and a processor operatively coupled to the ToF sensor and to the lighting module. The sensing and alert system is affixed to an inside portion of each switchgear cabinet. The processor compares real-time image data from the ToF sensor to the stored calibration image data and transmits an alarm if the difference is greater than a predetermined amount.

10 Claims, 8 Drawing Sheets

(51) Int. Cl.

| | |
|---|---|
| *H04N 5/225* | (2006.01) |
| *H02H 7/22* | (2006.01) |
| *H05B 33/08* | (2020.01) |
| *H05B 37/02* | (2006.01) |
| *H02B 13/02* | (2006.01) |
| *G06K 9/20* | (2006.01) |
| *H02B 1/26* | (2006.01) |
| *G06K 9/00* | (2022.01) |
| *G01S 17/88* | (2006.01) |
| *H05B 47/16* | (2020.01) |
| *G01S 17/04* | (2020.01) |
| *H05B 47/125* | (2020.01) |
| *F16P 3/14* | (2006.01) |
| *F16P 3/08* | (2006.01) |
| *H02B 3/00* | (2006.01) |

(52) U.S. Cl.
CPC ......... *G06K 9/00771* (2013.01); *G06K 9/209* (2013.01); *G06T 7/0008* (2013.01); *G08B 21/18* (2013.01); *H02B 1/26* (2013.01); *H02B 13/02* (2013.01); *H02H 7/222* (2013.01); *H04N 5/2256* (2013.01); *H05B 47/125* (2020.01); *H05B 47/16* (2020.01); *F16P 3/08* (2013.01); *F16P 3/142* (2013.01); *G06T 2207/10028* (2013.01); *G06T 2207/30232* (2013.01); *H02B 3/00* (2013.01)

(56) References Cited

U.S. PATENT DOCUMENTS

| | | | |
|---|---|---|---|
| 2007/0121265 A1* | 5/2007 | Hill, III | H02H 1/0061 |
| | | | 361/62 |
| 2012/0095575 A1* | 4/2012 | Meinherz | G05B 19/4061 |
| | | | 700/79 |
| 2013/0275813 A1 | 10/2013 | Loganathan et al. | |
| 2014/0307087 A1* | 10/2014 | Evanitsky | G08G 1/052 |
| | | | 348/143 |
| 2014/0347441 A1* | 11/2014 | Latorre | H04N 5/23238 |
| | | | 348/36 |
| 2015/0070507 A1* | 3/2015 | Kagan | G06F 21/32 |
| | | | 348/160 |
| 2015/0097666 A1* | 4/2015 | Boyd | G08B 3/10 |
| | | | 340/517 |
| 2016/0104046 A1* | 4/2016 | Doettling | H04N 13/239 |
| | | | 382/103 |
| 2016/0327611 A1* | 11/2016 | Ware | H01H 71/04 |
| 2017/0115649 A1 | 4/2017 | Richardson et al. | |
| 2017/0256934 A1* | 9/2017 | Kennedy | H02H 3/20 |
| 2018/0178797 A1* | 6/2018 | Seaman | B60W 10/184 |

OTHER PUBLICATIONS

International Search Report and Written Opinion, dated Mar. 7, 2019, from International Application No. PCT/US2018/064075, filed on Dec. 5, 2018. 17 pages.

* cited by examiner

SENSING AND ALERT SYSTEM FOR ELECTRICAL SWITCHGEAR

BACKGROUND

1. Technical Field

The present disclosure relates to a system for providing automatic lighting and warning during maintenance for electrical switchgear cabinetry.

2. Background

High-voltage electrical switchgear is used to control, protect, and isolate electrical equipment. Typically, in an enclosed building, the high-voltage switchgear is contained in one or more cabinets located in a secure electrical room. Depending on the voltage levels involved, the switchgear may be located in an electrical substation or in an outdoor staging area. The high-voltage switchgear includes programmable logic controllers (PLC) configured to control one or more cabinets, and each cabinet may include high-voltage, high-current circuit breakers, fuses, and other components used to energize and de-energize the switchgear to allow work to be performed and clear faults downstream.

Switchgear can be dangerous, and accidents can, and do occur. This is especially true when the high-voltage equipment is re-energized. During re-energization of the equipment, if an abnormal condition develops, which may be caused by poor design, a stray object or tool being dropped inside the cabinet, by faulty wiring, or by a ground-fault, a large electrical arc or an explosion may be produced. Such an electrical arc can be lethal many feet away, and depending on the power levels involved, could be potentially lethal to anyone within the entire electrical room. A large electrical arc may be produced even at lower voltages, such as 480 volts, if the current is sufficiently large.

Lighting in high voltage rooms is often poor and typically uncontrolled. Such room lighting is not sufficient for the technician to comfortably see inside the cabinet once the cabinet door is opened during the time that a technician may be performing repairs or maintenance. Further, existing cabinets do not provide safety features to warn the technician to remain at a safe distance away from the cabinet or to notify a main-office supervisor during high-risk events, such as re-energization. It is difficult to retrofit safety and lighting into existing electrical cabinets because such cabinets are subject to very stringent UL (Underwriter Laboratory) specifications, and such UL specifications do not permit drilling into the cabinet for any reason to attach components.

SUMMARY

A sensing and alert system is installed in a plurality of electrical switchgear cabinets. Each switchgear cabinet includes at least one high-voltage circuit breaker, and each switchgear cabinet is in communication with a central programmable logic controller (PLC) configured to activate and deactivate the high-voltage circuit breaker in the corresponding switchgear cabinet during maintenance conditions. The sensing and alert system includes a time of flight (ToF) sensor arranged to capture real-time image data, a lighting module affixed to an inside portion of the switchgear cabinet, and a processor operatively coupled to the ToF sensor and to the lighting module. The sensing and alert system is affixed to an inside portion of each switchgear cabinet so that the ToF sensor is in direct line-of-sight of an inside portion of a door of the cabinet. The lighting module is positioned so as to illuminate an inside portion of the cabinet when activated. The processor is configured to receive the real-time image data from the ToF sensor and compare the real-time image data with stored calibration image data. If the real-time image data differs from the stored calibration image data by more than a predetermined amount, the processor transmits an alarm signal to the central PLC, and activates the lighting module. When the central PLC receives the alarm signal from the processor, it deactivates the high-voltage circuit breaker in the corresponding switchgear cabinet. In some embodiments, the PLC may transmit to a monitoring station an indication that the door to the switchgear cabinet has been opened, which in some situations could indicate unauthorized access to the switchgear cabinet.

BRIEF DESCRIPTION OF THE DRAWINGS

The system may be better understood with reference to the following drawings and the description. The components in the figures are not necessarily to scale, emphasis instead being placed upon illustrating the principles disclosed. Moreover, in the figures, like-referenced numerals designate corresponding parts throughout the different views. motion detection not sufficient, someone lying on floor or sleeping, so need to compare visual images so lights don't go off

DETAILED DESCRIPTION

Figure 1:
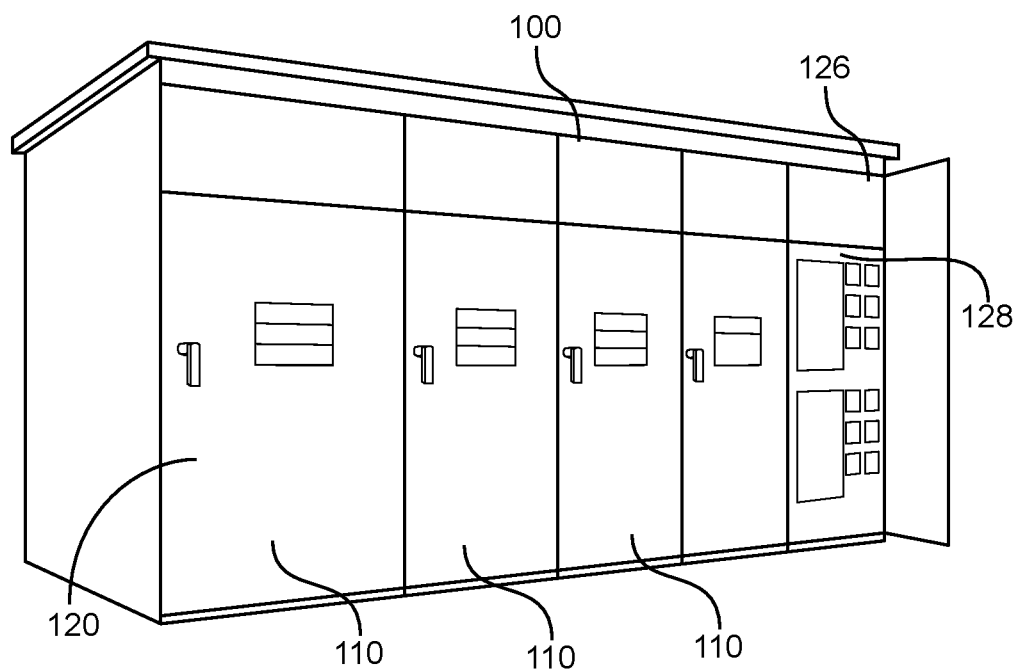
FIG. 1 is a pictorial representation of switchgear cabinetry.

FIG. 1 illustrates a typical switchgear cabinet arrangement 100 according to one embodiment, including four high-voltage switchgear cabinets 110, each having one or more high-voltage circuit breakers disposed internal to the cabinet 110 and protected by a lockable door 120. A control cabinet 126 houses a controller, which may be a central programmable logic controller (PLC) 128. The central PLC 128 may control one or many switchgear cabinets 110. For purposes of clarity only four switchgear cabinets 110 are shown, but any suitable number of switchgear cabinets may be included depending upon the size of the installation and the particular application.

Figure 2:
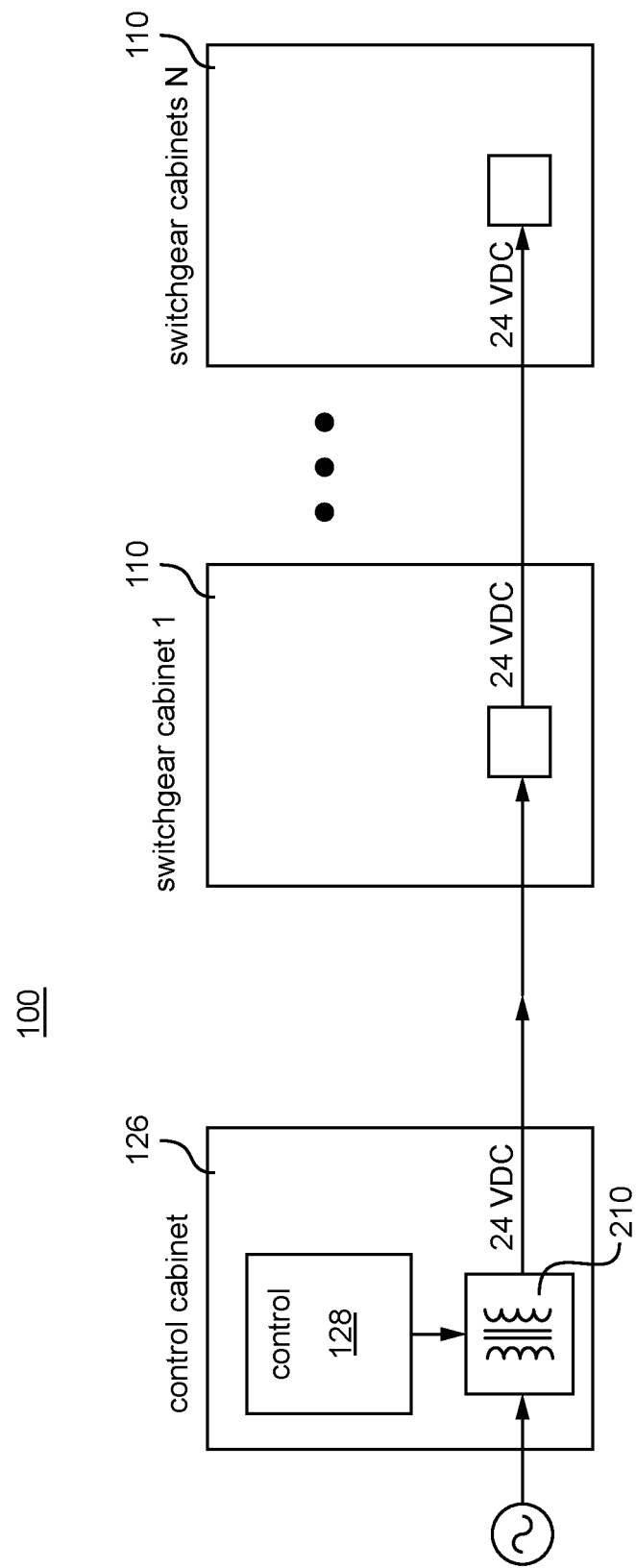
FIG. 2 is a high-level block diagram showing a plurality of daisy-chained switchgear cabinets according to one embodiment.

FIG. 2 is a high-level block diagram according to one embodiment of the switchgear cabinet arrangement 100. The control cabinet 126 may house various transformers 210 that provide 24 volts DC, which is the preferred voltage level for the central PLC 128 and associated control signals. The 24 volt DC signal may be provided by the control cabinet 126 to each high-voltage switchgear cabinet 110 in a daisy-chain manner from cabinet to cabinet using standard wiring. Use of 24 volt DC control signaling is preferably because 24 volts is sufficiently low so as not to present a shock hazard if inadvertently touched by a human, yet sufficiently high so as to be resistant to electrical noise and other induced or stray radiation. A battery backup system (not shown) may also provide the 24 volt DC power to the components.

Figure 3:
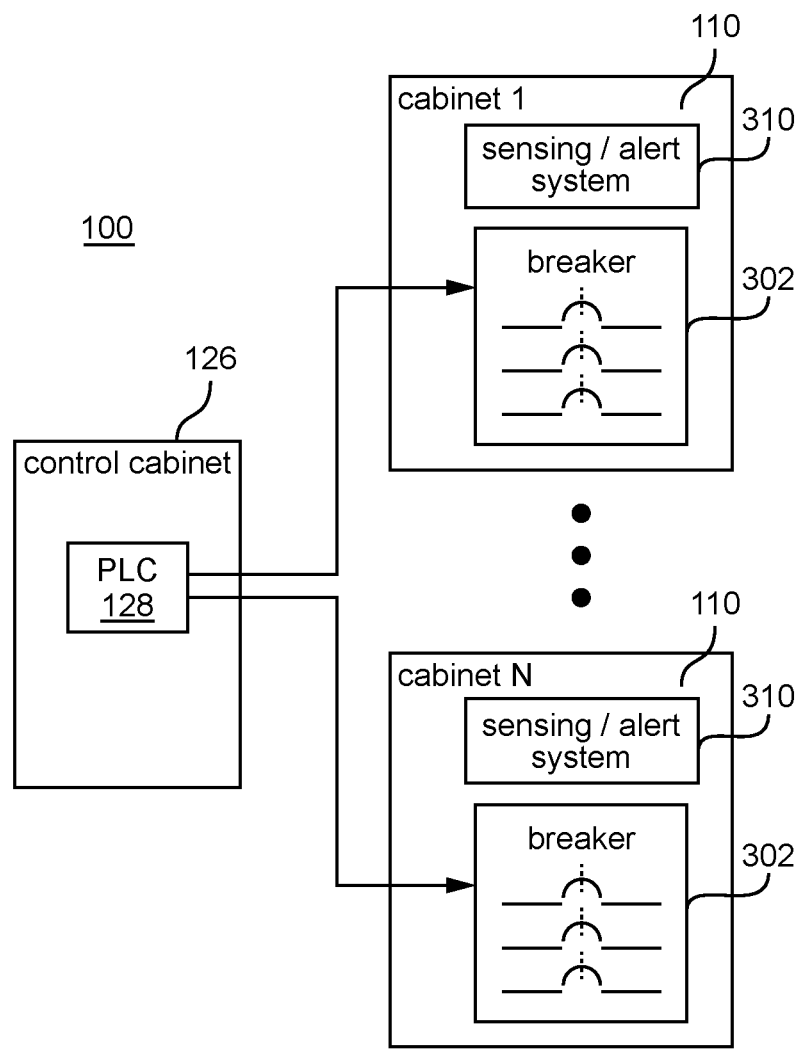
FIG. 3 is a block diagram showing a control switchgear cabinet and a plurality of controlled switchgear cabinets according to one embodiment.

FIG. 3 is a high-level block diagram of the switchgear cabinet arrangement 100 according to one embodiment, which shows the control cabinet and associated central PLC 126. The central PLC 126 may control the plurality of high-voltage switchgear cabinets 110, each of which includes one or more high-voltage circuit breakers 302 and a sensing and alert system 310. The high-voltage circuit breaker 302 of each switchgear cabinet 110 may be controlled by the central PLC 128. The central PLC 128 generates 24 volt control signals to energize and de-energize the corresponding high-voltage circuit breaker 302 through one or more relays (not shown), which may be responsive to the 24 volt control signals generated by the central PLC.

Figure 4A:
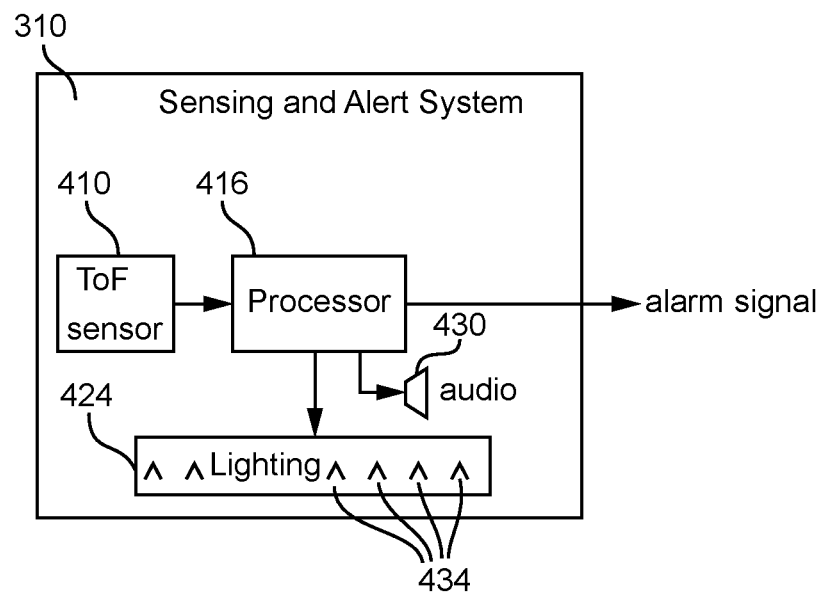
FIG. 4A is a block diagram of a sensing and alert system according to one embodiment.
Figure 4B:
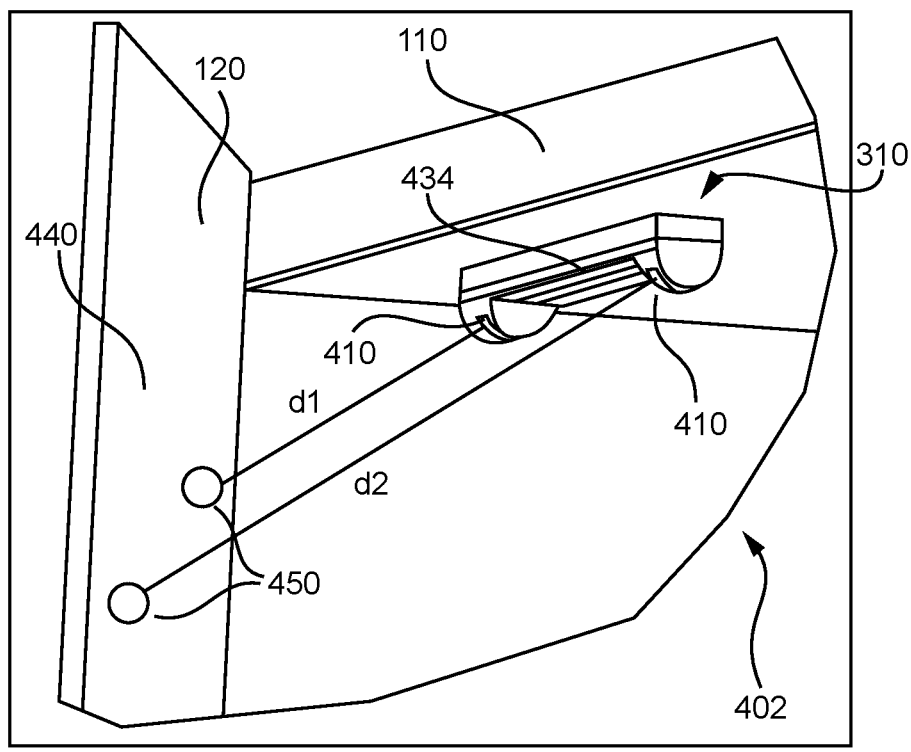
FIG. 4B is a pictorial representation of the sensing and alert system of FIG. 4A.

FIG. 4A is a schematic block diagram of a sensing and alert system 310 and FIG. 4B is a pictorial representation of the sensing and alert system of FIG. 4A. The sensing and alert system 310 may be affixed to an inside portion 402 of each switchgear cabinet 110. The sensing and alert system 310 is preferably contained within a single module or board, and includes a time of flight (ToF) camera or sensor 410, a processor 416, a lighting module 424, and an audible alarm component 430. However, the ToF sensor/camera 410, the processor 416 and the lighting module 424 may be separate components and may be installed separately but in close proximity to each other. The processor 416 may be operatively coupled to the ToF sensor/camera 410 and to the lighting module 424. The processor 416 may receive data from the ToF sensor/camera 410 and control high-intensity LED lamps 434 in the lighting module 424 in response thereto.

The sensing and alert system 310 is preferably affixed magnetically to an inside portion 402 of each switchgear cabinet 110 and is arranged to capture real-time image data in a direct line-of-sight of an inside portion 440 of the door 120 of the switchgear cabinet 110, and to facilitate illumination of the inside portion 402 of the switchgear cabinet 110 by the LED lamps 434 of the lighting module 424 when activated. Alternatively, the sensing and alert system 310 may be affixed using a suitable chemical adhesive. Magnetic attachment complies with UL requirements because no holes need be drilled. Additionally, known mechanical switches are disadvantageous, even if affixed magnetically or with chemical adhesive, because the frequent opening and closing of the cabinet doors 120, in addition to the large vibrations caused when the high-voltage breakers 302 activate and deactivate, tends to move or dislodge such mechanical switches. Preferably, the sensing and alert system 310 receives operating power from the 24 volt DC power source provided in each switchgear cabinet 110.

The processor 416 is operatively coupled to the ToF sensor/camera 410, which is configured to obtain real-time image data captured in a direct line-of-sight of the inside portion 440 of the door 120 of the switchgear cabinet 110. Essentially, the ToF sensor/camera 410 provides data for determining if the door 120 of the switchgear cabinet 110 is open or closed. In a preferred embodiment, the ToF sensor/camera 410 is a model EPC610 Camera Module, commercially available from Polytec GmbH of Germany. In practice, the ToF sensor/camera 410 is initially calibrated so as to store in memory associated with the processor 416, real-time data or data images corresponding to the inside portion 440 of the cabinet door 120 when the door is in the closed position. The EPC610 camera module may provide an 8×8 pixel array or sensor points corresponding to each captured image. However, any suitable time of flight sensor or camera may be used, and such suitable time of flight sensors or cameras may provide only a single pixel of data. In such an embodiment, two time of flight sensors or cameras, each providing a single pixel of data may be needed.

Thereafter, the ToF sensor/camera 410 captures in real-time, or periodically, data or image data of the inside portion 440 of the cabinet door 120, and transmits this data to the processor 416, which compares the real-time image data with the stored calibration image data to determine if there are any changes. If the real-time image data differs from the stored calibration image data by more than a predetermined amount, the processor 416 recognizes an alarm condition and activates the lighting module 424 to illuminate the inside portion 402 of the switchgear cabinet 110.

Each pixel of data from the ToF sensor/camera provides a distance indication to the target. If the modulo difference between the pixel data and the calibration data for each pixel is smaller than a predetermined amount the lamp will remain off. If the modulo difference is greater than a measurement error (for any of the pixels) the lamp is turned on immediately and remains on until the acquired real-time image matches the calibration data (modulo difference for all pixels are lower than the error) for more than one second. Thus, the alarm condition is met, as the door to the switchgear cabinet is considered to be open.

The processor 416 may also activate the audible alarm 430. Because of the alarm condition, the processor 416 may also send an alarm signal to the central PLC 128. The central PLC 128, upon receipt of the alarm signal from the processor 416, may deactivate the high-voltage circuit breaker 302 in the corresponding switchgear cabinet 110.

In an alternate embodiment, the ToF sensor/camera 410 may be integrated with an on-board image processor so that calibration and comparison of real-time image data is performed by the ToF sensor assembly, such as by the EPC610 camera module. However, any suitable ToF camera, sensor, module, or assembly may be used. For example, the EPC610 camera module or other ToF camera may include a local processor that is used for distance calculation, linearization, and/or error correction. In such an embodiment, if the real-time image data differs from the stored calibration image data by more than a predetermined amount, the ToF sensor assembly 410 may transmit the alarm signal to the processor 416, as described above.

Note that when the processor 416 controls the lighting module 424 to activate the LED lamps 434, the lighting module 424 remains activated until a predetermined time after the processor 416 determines that the real-time image data is not different than the stored calibration image data by more than a predetermined amount. This ensures that the area remains illuminated for a period of time, such as for example, two minutes, even after the condition that caused the alarm returns to a normal condition, for example once the cabinet door 120 is shut.

The sensing and alert system 310 accordingly to some embodiments relies on image comparison rather than motion detection, thermal detection, and the like, and thus the lights 434 will not be inadvertently deactivated while still needed.

In known alarm systems using motion sensing or thermal sensing, it is possible that such an alarm system could deactivate the lighting/alarm if the person or object causing the alarm condition remains motionless for a period of time, which period of time would most likely correspond to a factory default "no-motion" time setting in the system. Thus, known motion sensing systems require periodic "re-triggering." Similar drawbacks exist with system using thermal sensing. Such thermal systems may be insensitive to objects that have the same temperature as the ambient environment.

As discussed above, the ToF sensor/camera 410 may be incorporated in a commercially available ToF module, such as the model EPC610 camera module commercially available from Polytec GmbH of German. Referring to FIG. 4B, alternatively, the ToF sensor/camera 410 may be a multi-point ToF sensor or camera used in a stand-alone application. In this embodiment, the ToF sensor/camera 410 preferably performs multipoint measurements, with a minimum of two image data points captured. This is essentially a "snapshot" of the scene, which may be continuously taken in real-time and correlated with previously stored calibration data (ToF image). In the real-time captured frame is different from the calibration image or frame, the alert is raised. The ToF sensor/camera 410 may measure distance using on infrared light (IR) emitter based on flight time reflection. The ToF sensor/camera 410 is a multipoint ToF sensor configured to measure the distance from the ToF camera to different points in a direction in the field of view of the ToF sensor/camera 410. In some embodiments, only a low resolution ToF sensor/camera and image engine are required, but in other embodiments, a higher resolution system may be used.

In another embodiment, two low-resolution ToF sensor/cameras 410 may be used to continuously evaluate switchgear cabinet door displacement. In this embodiment, the two ToF sensors/cameras 410 may be configured to measure the distance from the ToF sensor/camera 410 to two different points 450 on the door 120. This prevents the situation where, for example, a worker is placed in front of one sensor at the same distance where the door would be, such as at a distance equal to the distance when calibration occurred. In this situation the stored correlation might match for a single low-resolution ToF sensor/camera 410. However, such a situation would not match for the second low-resolution ToF sensor/camera 410. Thus, a false indication of a closed door is avoided.

Figure 5A:
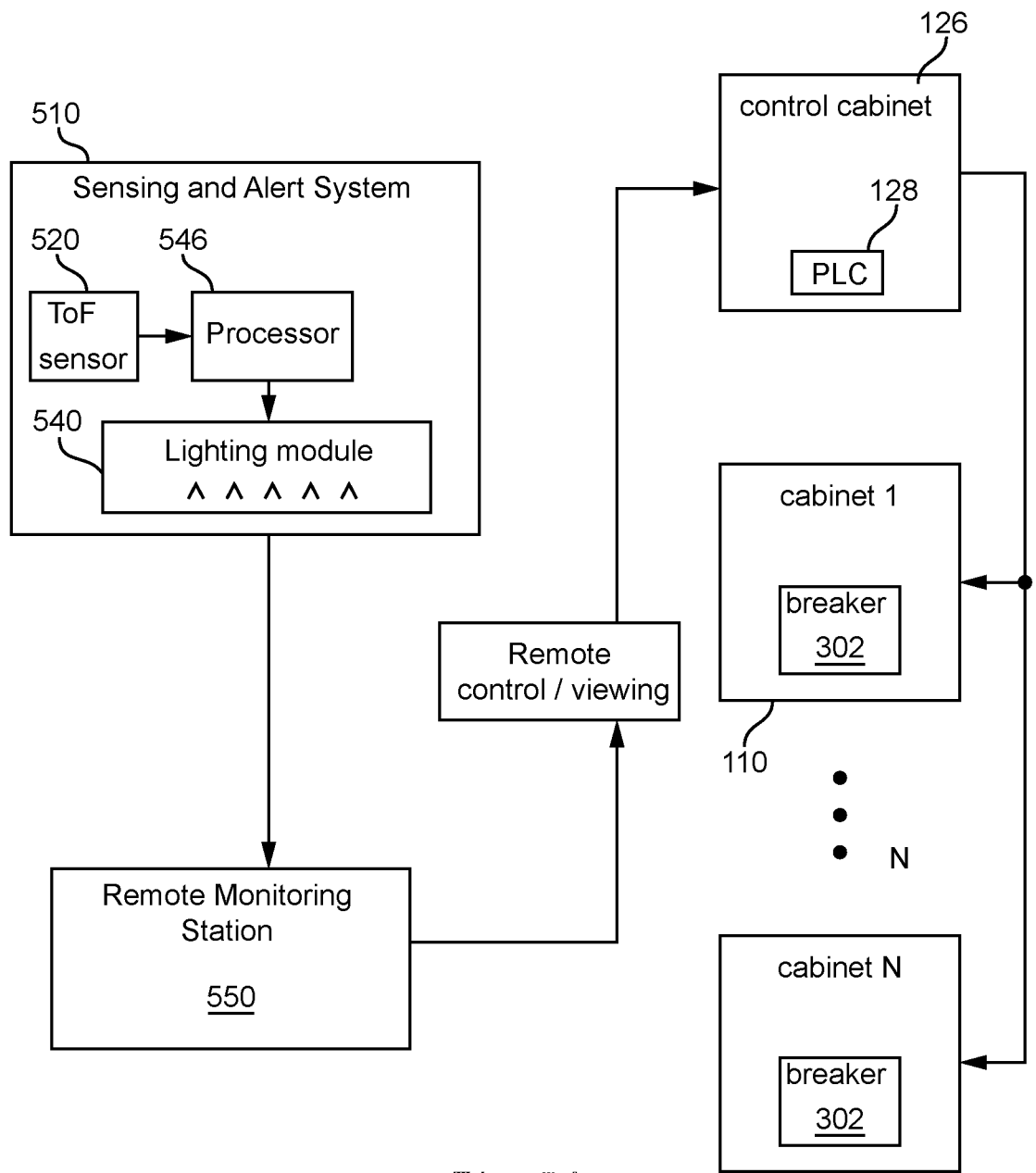
FIG. 5A is a block diagram of a sensing and alert system according to another embodiment.
Figure 5B:
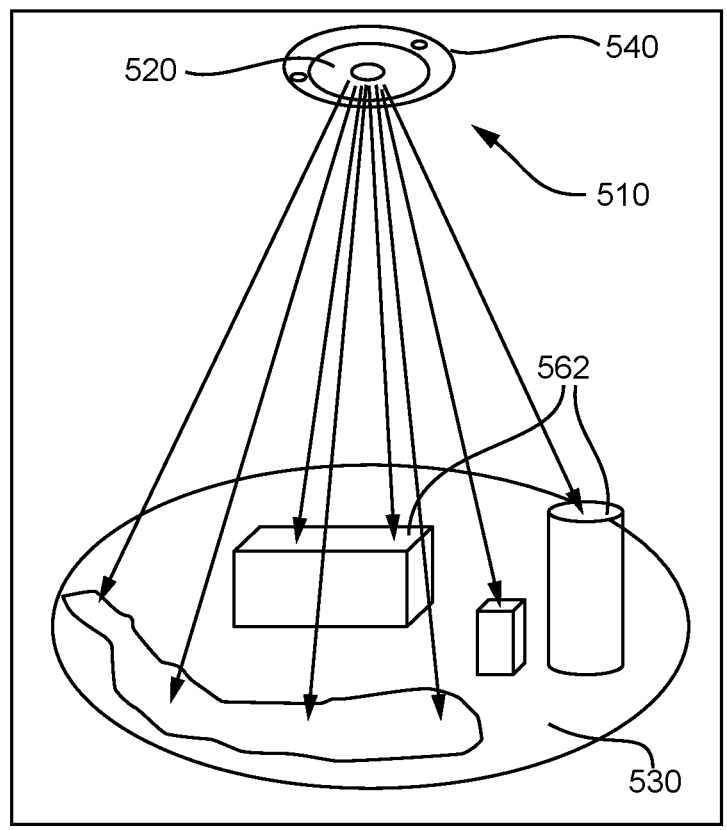
FIG. 5B is a pictorial representation of the sensing and alert system of FIG. 5A.

Referring to FIG. 5A, this is a block diagram of an alternate embodiment of the sensing and alert system 510, which may be affixed external to the electrical switchgear cabinet 110 in a position proximal to the electrical switchgear cabinet 110, and arranged so that a ToF sensor/camera 520, which may be of the same type as in the previous figures, captures real-time image data in a predefined area 530 proximal to the switchgear cabinet 110. FIG. 5B is a pictorial representation of the alternate embodiment of FIG. 5A.

In this embodiment, a lighting module 540 (either the same as shown in the prior drawings or the installed ceiling lighting) illuminates the predefined area 530 proximal to the switchgear cabinet 110 when activated. Like the previous embodiment, a processor 546 is configured to receive the captured real-time image data from the ToF sensor/camera 520 and compare the real-time image data with stored calibration image data. If the real-time image data differs from the stored calibration image data by more than a predetermined amount, the processor 520 transmits an alarm signal to a remote monitoring station 550, and activates the lighting module 540. The remote monitoring station 550, upon receipt of the alarm signal from the processor 546, may facilitate various actions either automatically or under human control.

If under automatic control, the remote monitoring station 550 may deactivate the high-voltage circuit breaker 302 in the corresponding switchgear cabinet 110 by sending a command to the central PLC 128. If under human control, the human supervisor may elect to view a CCTV or web-based camera image of the electrical room via a remote means 560 to determine if the situation requires further intervention, such as by manually directing one or more central PLCs 128 to deactivate or activate certain high-voltage circuit breakers 302. Further, in response to the alarm signal from the sensing and alert system, the human supervisor may send various messages to other personnel, such as to personnel in a generator room or other remote area.

In the embodiment of FIGS. 5A and 5B, rather than comparing image data to determine if a cabinet door is open or closed as in FIGS. 4A and 4B, the ToF sensor/camera 520 and processor 546 may determine if a particular area (or 3-D volume) or viewing scene has changed in a non-permissible way, for example if a worker has entered a prohibited zone 562. The alert process in this embodiment is similar to the alert process for the embodiment of FIGS. 4A and 4B, that is, an alert is issued when the real-time image data for the prohibited zone differs from the stored calibration image data by more than a predetermined amount. However, the calibration process may be more complex in this embodiment as discussed below.

In that regard, the sensing and alert system 510 may be calibrated based on the scene or area (or 3-D volume) viewed by the ToF sensor/camera 520, including field of depth information. During calibration, a technician walks about the restricted or forbidden area 562. During this area or "volumetric" calibration process, the ToF sensor/camera 520 records scene snapshots and generates a mapping with altered sets of points corresponding to measured distances. Each image or snapshot records a displacement based on the technician walking about during the calibration cycle. The map of the sum of all of the altered points (displacements) located in the ToF field of view is saved as the calibration data, and represents the restricted area. This data may be stored as "inverse" data because the data collected represents a "disallowed" area or an area that triggers the alarm.

In an alternate embodiment, the calibration process may be performed in two distinct steps or processes. First, the ToF camera/sensor may image and record an "empty scene" within its field of view. Second, a technician may enter and walk about the prohibited zone. All altered or changed images points relative to the "empty scene" represent the prohibited zone map, which will be stored as well. The processor will consider the pixels data changes only within the forbidden zone with respect to determining an alarm condition. The lighting module will be turned on based on any pixels changing, but the alarm condition will be declared only based on pixel data changes within the prohibited zone.

In one specific embodiment of FIGS. 5A and 5B, the lighting module 540 may be turned on if any activity at all is detected in the field of view of the ToF sensor/camera 520. However, in this specific embodiment, the alarm is transmitted only if activity is detected in the forbidden area 562.

Figure 6:
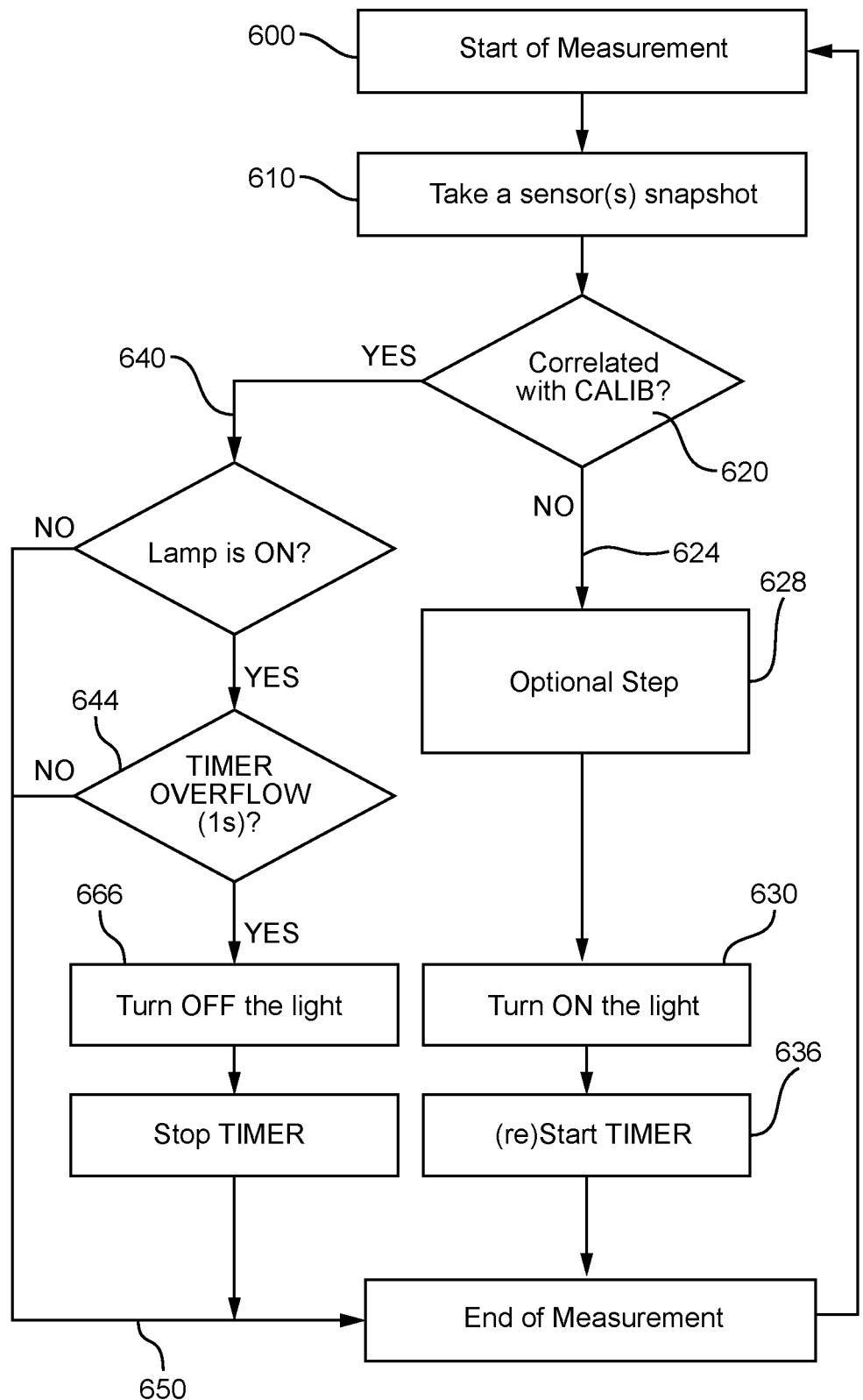
FIG. 6 is a flowchart of a working mode according to one embodiment.

Once the calibration data or baseline scene has been established, the sensor and alert system 310, 510 enters the "armed" mode where constant monitoring occurs. FIG. 6 is a flowchart of post-calibration or "working mode" monitoring 600. During working mode, the ToF sensor/camera and processor monitor and execute continuously. Preferably, between two successive measurement cycles, the sensing and alert circuitry, such as the processor and ToF sensor/camera, are placed in sleep mode for a predetermined period of time so as to minimize power draw. Every measurement cycle begins with a scene snapshot 610 to collect image data. The snapshot data is compared 620 with the stored calibration data in a correlation step, and if the real-time captured data does not match the calibration data 624, the processor may execute an optional step 628, turn on the lighting module 630 and begin a one second timer 636, although any suitable time period may be selected. The optional step 628 may verify if the deviation between the real-time captured data does not match the calibration data is small. This may indicate that the door is mostly closed, but not completely closed and latched, and thus the door could appear closed to the casual observer, when in fact, it is not.

The timer may be reset after each non-correlated measurement. Next, if the captured real-time data does correlate with or match 640 the calibration data (e.g., the cabinet door is closed), the timer is verified 644 and if there is no overflow, the monitoring cycle is ended 650 without turning off the lamp. This acts as a filter to prevent the lamp from inadvertently being turned off due to a "noisy" snapshot. During the next measurement, assuming the captured real-time data correlates with the calibration data and the timer has expired, the light is turned off 656.

Figure 7:
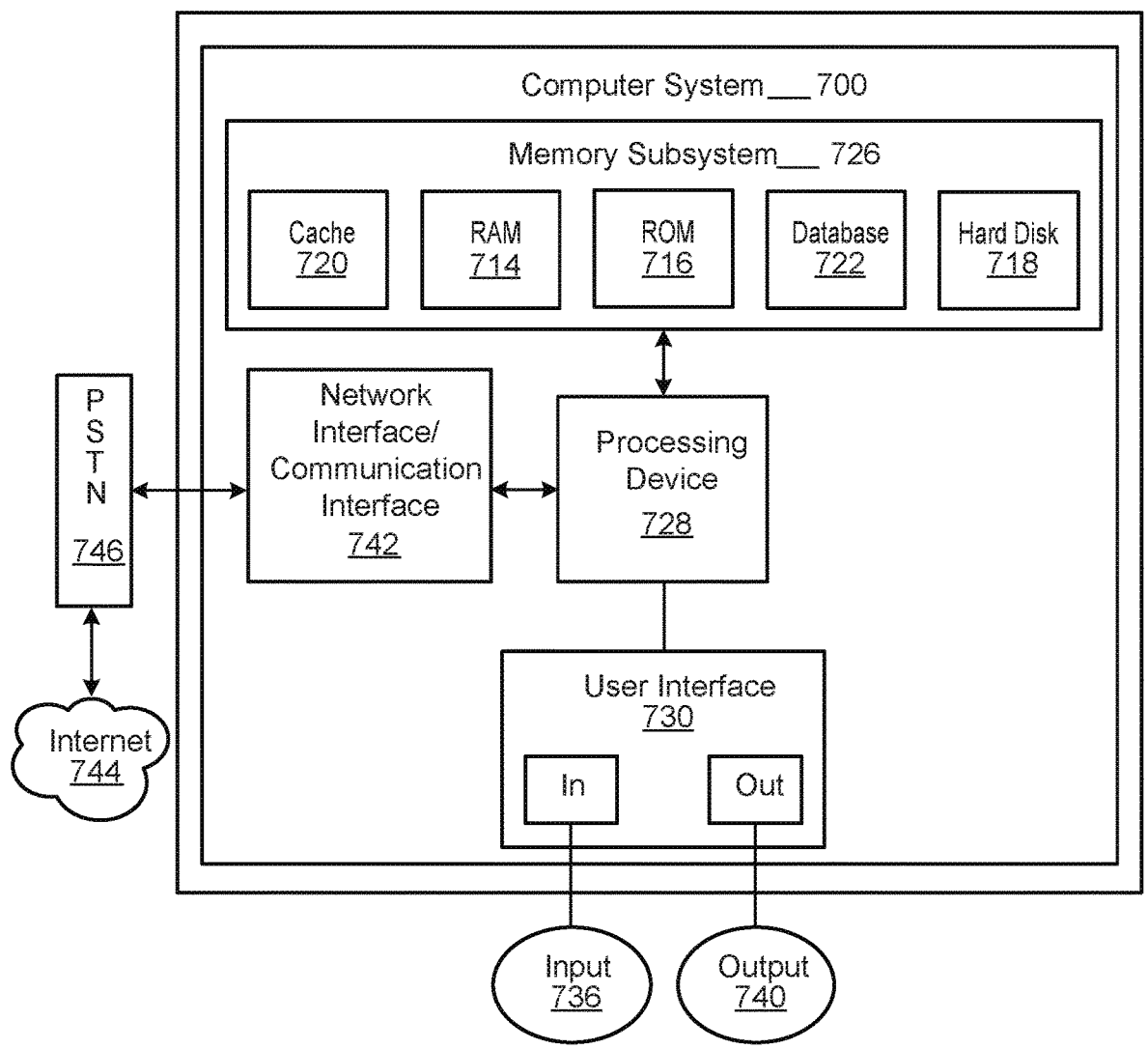
FIG. 7 is a block diagram of an exemplary computer system or processor, such as the processor of the sensing and alert system according to one embodiment.

FIG. 7 is a high-level hardware block diagram of one embodiment of the processor or computer system hardware, which may be part of or incorporated into the sensing and alert system Such a computer system 700 may be embodied as a system cooperating with computer hardware components and/or as computer-implemented methods and is shown in FIG. 7 as a high-level hardware block diagram of a system computer 700 that may be used to execute software or logic to implement the processing of the components, modules, and/or subsystems described above.

The sensing and alarm system may be used in conjunction with any area to be monitored and need not necessarily be placed proximal to an electrical switchgear cabinet. Any area that requires secure monitoring may be the subject of the sensing and alert system.

The computer or processor 700 may include various hardware components, such as RAM 714, ROM 716, hard disk storage 718, cache memory 720, database storage 722, and the like (also referred to as "memory subsystem 726"). The computer 700 may include any suitable processing device 728, such as a computer, microprocessor, RISC processor (reduced instruction set computer), CISC processor (complex instruction set computer), single-chip computer, distributed processor, server, controller, micro-controller, discrete logic computer, and the like, as is known in the art. For example, the processing device 728 may be an Intel Pentium® microprocessor, x86 compatible microprocessor, Raspberry Pi, or equivalent device.

The memory subsystem 726 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 730 may be coupled to the computer system 700 and may include various input devices 736, such as switches selectable by the system manager and/or a keyboard. The user interface also may include suitable output devices 740, such as an LCD display, a CRT, various LED indicators, a printer, and/or a speech output device, as is known in the art.

To facilitate communication between the computer 700 and external sources or other components, modules, and subsystems, a communication interface 742 may be operatively coupled to the computer system 700. The communication interface 742 may be, for example, a local area network, such as an Ethernet network, intranet, Internet, or other suitable network 744. The communication interface 742 may also be connected to a public switched telephone network (PSTN) 746 or POTS (plain old telephone system), which may facilitate communication via the Internet 744. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A sensing and alert system for a plurality of electrical switchgear cabinets, each switchgear cabinet including at least one high-voltage circuit breaker, and each switchgear cabinet in communication with a central programmable logic controller (PLC) configured to activate and deactivate the high-voltage circuit breaker in the corresponding switchgear cabinet, the sensing and alert system comprising:
    a time of flight (ToF) sensor arranged to capture real-time image data;
    a lighting module affixed to an inside portion of the switchgear cabinet;
    a processor operatively coupled to the ToF sensor and to the lighting module; the sensing and alert system affixed to an inside portion of each switchgear cabinet so that the ToF sensor is in direct line-of-sight of an inside portion of a door of the cabinet, wherein the ToF sensor provides data for determining if the door of the switchgear cabinet is open or closed, and the lighting module is positioned so as to illuminate an inside portion of the cabinet when activated;
    the processor configured to receive the real-time image data from the ToF sensor and compare the real-time image data with stored calibration image data, wherein if the real-time image data differs from the stored calibration image data by more than a predetermined amount, the processor transmits an alarm signal to the central PLC, and activates the lighting module; and
    wherein, the central PLC, upon receipt of the alarm signal from the processor, deactivates the at least one high-voltage circuit breaker in the corresponding switchgear cabinet.

2. The system according to claim 1, wherein the lighting module, the processor, and the ToF sensor receive power from a 24 volt DC power source provided within each electrical cabinet.

3. The system according to claim 1, wherein the ToF sensor is a Polytec epc610 camera module.

4. The system according to claim 1, wherein the central PLC controls the high-voltage circuit breakers in a plurality of electrical switchgear cabinets.

5. The system according to claim 1, wherein after the processor turns on the lighting module of a selected electrical cabinet, the lighting module remains activated until a predetermined time after the processor determines that the real-time image data is not different than the stored calibration image data by more than a predetermined amount.

6. The system according to claim 1, wherein the sensing and alert system is attached magnetically to an inside portion of the switchgear cabinet so as to comply with Underwriters Laboratory (UL) requirements for electrical switchgear cabinetry.

7. The system according to claim 1, further including two ToF sensors disposed in each electrical cabinet for redundant operation.

8. The system according to claim 1, wherein the lighting module includes a plurality of high-intensity LED lamps.

9. The system according to claim 1, wherein the stored calibration data corresponds to the inside portion of the cabinet door when the door is in a closed position.

10. The system according to claim 1, wherein the processor determines that the switchgear cabinet is open if the real-time image data differs from the stored calibration image data by more than a predetermined amount.

* * * * *